Dec. 4, 1923.  C. FREDRICKS  1,476,067
FISHING TACKLE
Filed Nov. 22, 1922
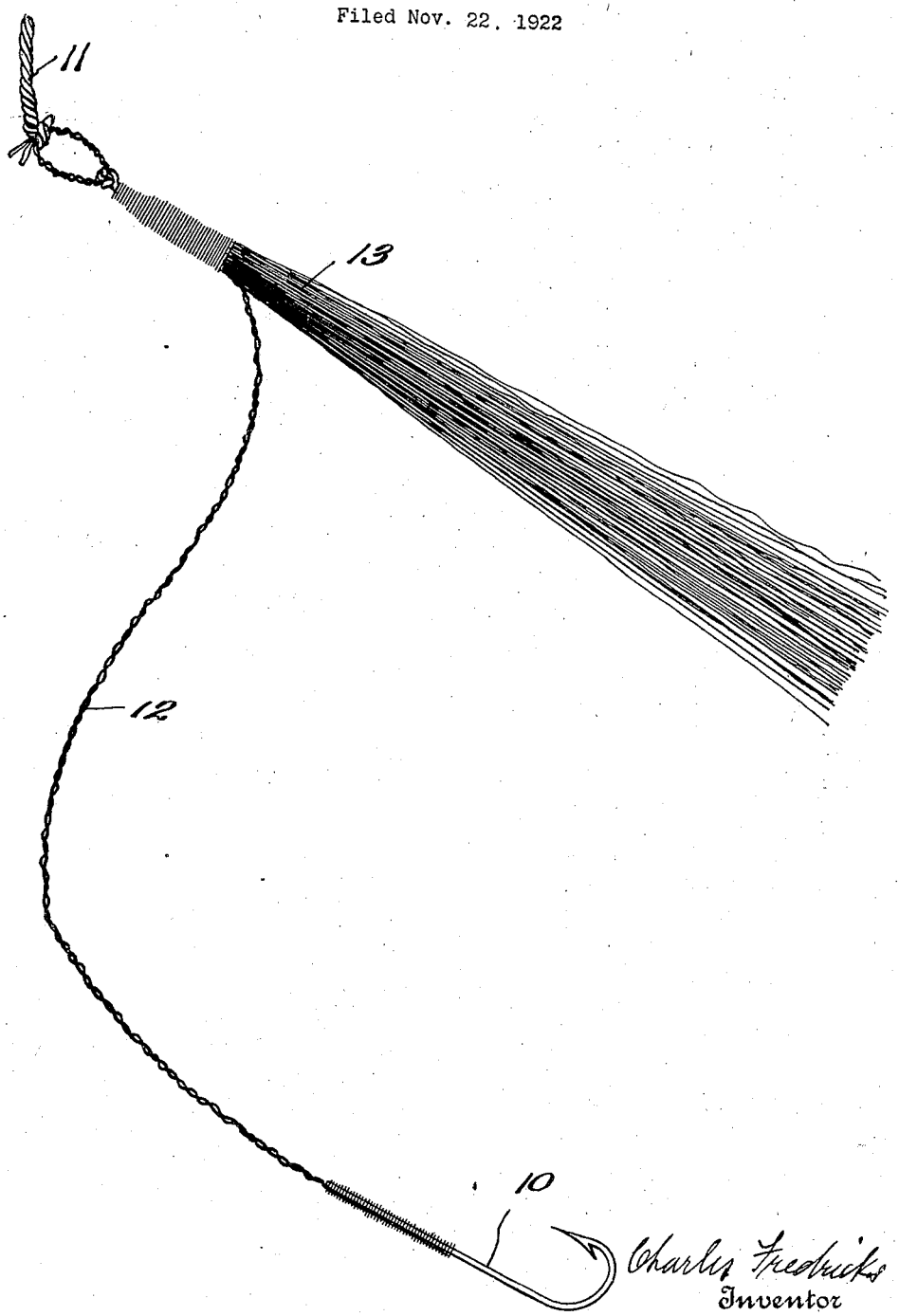

Patented Dec. 4, 1923.

1,476,067

UNITED STATES PATENT OFFICE.

CHARLES FREDRICKS, OF BROOKLYN, NEW YORK.

FISHING TACKLE.

Application filed November 22, 1922. Serial No. 602,525.

*To all whom it may concern:*

Be it known that I, CHARLES FREDRICKS, a citizen of the United States, residing in Brooklyn Borough, county of Kings, State of New York, have invented a certain Improvement in Fishing Tackle, of which the following is a specification.

The present invention relates to a novel and highly successful apparatus for use by anglers, embodying a novel principle in the attraction of deep sea fish.

In fresh water fishing it has been common hitherto to make "flies" and other artificial baits, generally used by depositing or twitching along on the surface of the water, in which feathers, tassels and the like are combined around or close to the hook in such a manner as to simulate a fly or other living bait. While these articles have been found useful in fresh water fishing, they have been found quite useless in salt water, and particularly in fishing for cod, haddock, and other deep water fish.

The present improvement, on the contrary, has been found very effective in promoting the success of deep sea fishing with hooks; having proved successful in catching cod as deep as seventeen fathoms. It is in no sense a bait, but is used in combination with a bait placed upon the hook.

The principle of the invention lies in the provision of an instrumentality which may be fitly called an "enticer," fastened to the line near enough to the true bait to bring the latter certainly to the attention of a fish which has been attracted by the enticer from a distance, but not so near as to interfere with easy access to the bait.

A preferred arrangement for this purpose is shown in side elevation in the accompanying drawing.

In the drawing, the hook 10 is shown connected to the end of the fish line 11 by means of the usual leader 12. The enticer consists of a bundle of strands 13 of silk worm gut or the like, colored red, and fastened together at one end at a material distance from the hook and bait. These strands may be straight or wavy, and they are preferably fastened just where the leader 12 is joined to the line 11.

By this arrangement the enticer serves to attract the attention of fish at a distance, simulating, as it does a bundle of sea worms or blood worms. When the fish that have noticed the enticer approach the same, their attention is caught by the true bait, which would otherwise only have attracted their notice if accidentally dropped near the original position of the fish.

What is claimed is—

In deep sea fishing tackle, a line, a hook connected therewith and an enticer consisting of a bundle of loose red gut strands supported by the line and located far enough from the hook to leave free the approach to the bait when on the hook.

In testimony whereof I have hereto set my hand on this 20th day of November 1922.

CHARLES FREDRICKS.